W. E. LOOMIS.
BRICK MOLD CONVEYING AND DUMPING APPARATUS.
APPLICATION FILED JUNE 30, 1909.

969,071.

Patented Aug. 30, 1910.
2 SHEETS—SHEET 2.

WITNESSES
Stuart R. Allen
Jas. B. Davis

INVENTOR
William E. Loomis.

UNITED STATES PATENT OFFICE.

WILLIAM E. LOOMIS, OF SHERBROOKE, QUEBEC, CANADA.

BRICK-MOLD CONVEYING AND DUMPING APPARATUS.

969,071.  Specification of Letters Patent.  Patented Aug. 30, 1910.

Application filed June 30, 1909. Serial No. 505,172.

*To all whom it may concern:*

Be it known that I, WILLIAM E. LOOMIS, of the city of Sherbrooke, in the Province of Quebec and Dominion of Canada, have invented certain new and useful Improvements in Brick-Mold Conveying and Dumping Apparatus, of which the following is a full, clear, and exact description.

This invention relates to improvements in brick mold conveying and dumping apparatus and the main object is to provide a simple and inexpensive device which will automatically pick up the filled molds as they are ejected from the brick machine, convey the same to a suitable point and then dump the plastic material out of the molds without mutilating the same.

A further object is to provide means whereby the plastic material will be prevented from escaping prematurely from the molds and whereby the material from each mold will be dumped onto a separate pallet.

A still further object is to provide a device which will return the emptied molds to the sander operated in conjunction with the brick making machine.

To accomplish these objects I provide a conveyer adapted to receive the filled molds from the brick machine and deliver them to a second conveyer operating at right angles to the first. At the point of transfer a pallet is positioned over each mold and is then carried therewith to a dumping table, the mold and pallet being inverted during carriage. The mold is now lifted off the pallet by the conveyer and dropped into the sander, the contents of the mold remaining on the pallet.

Figure 1:
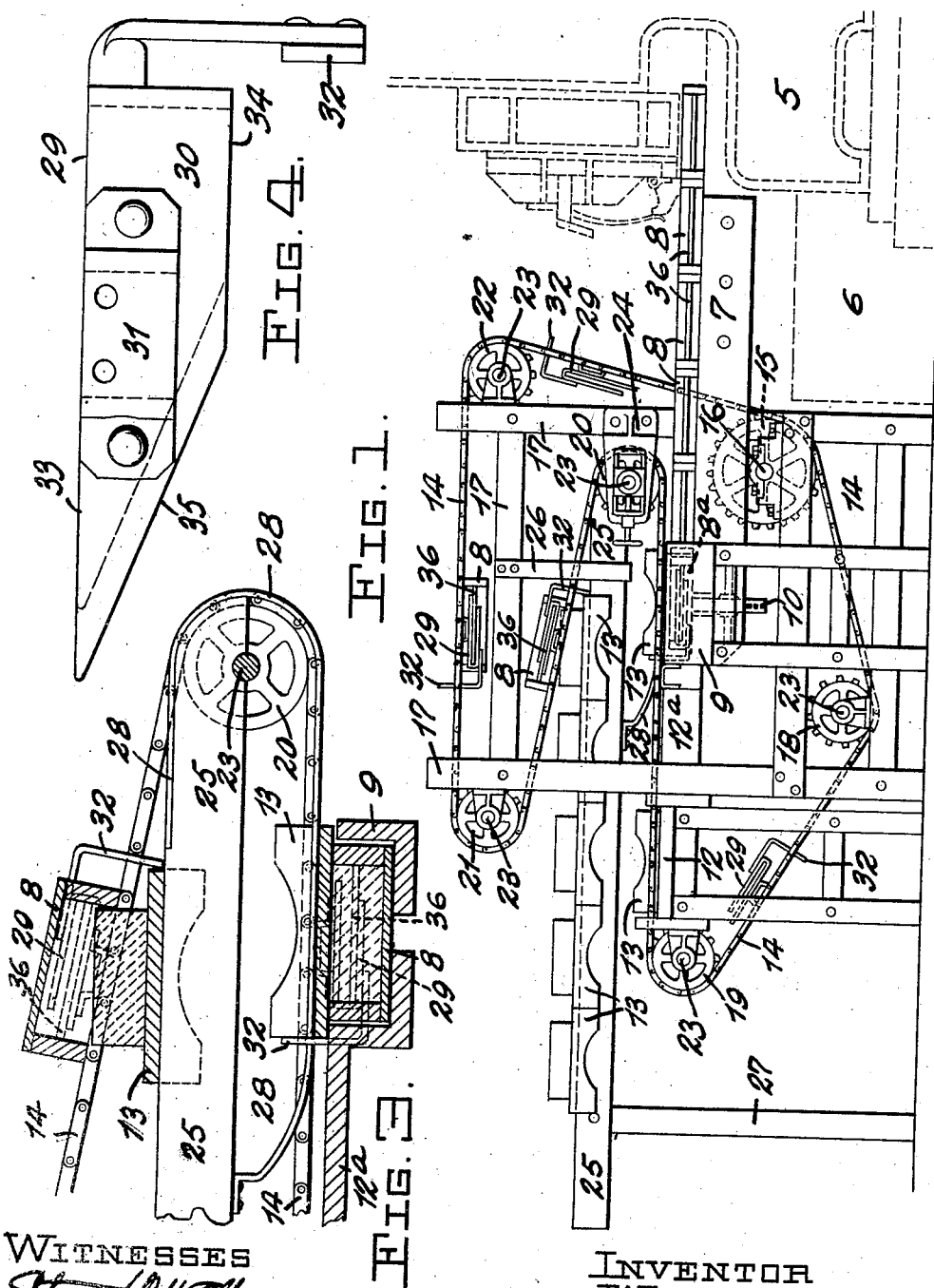
Figure 2:
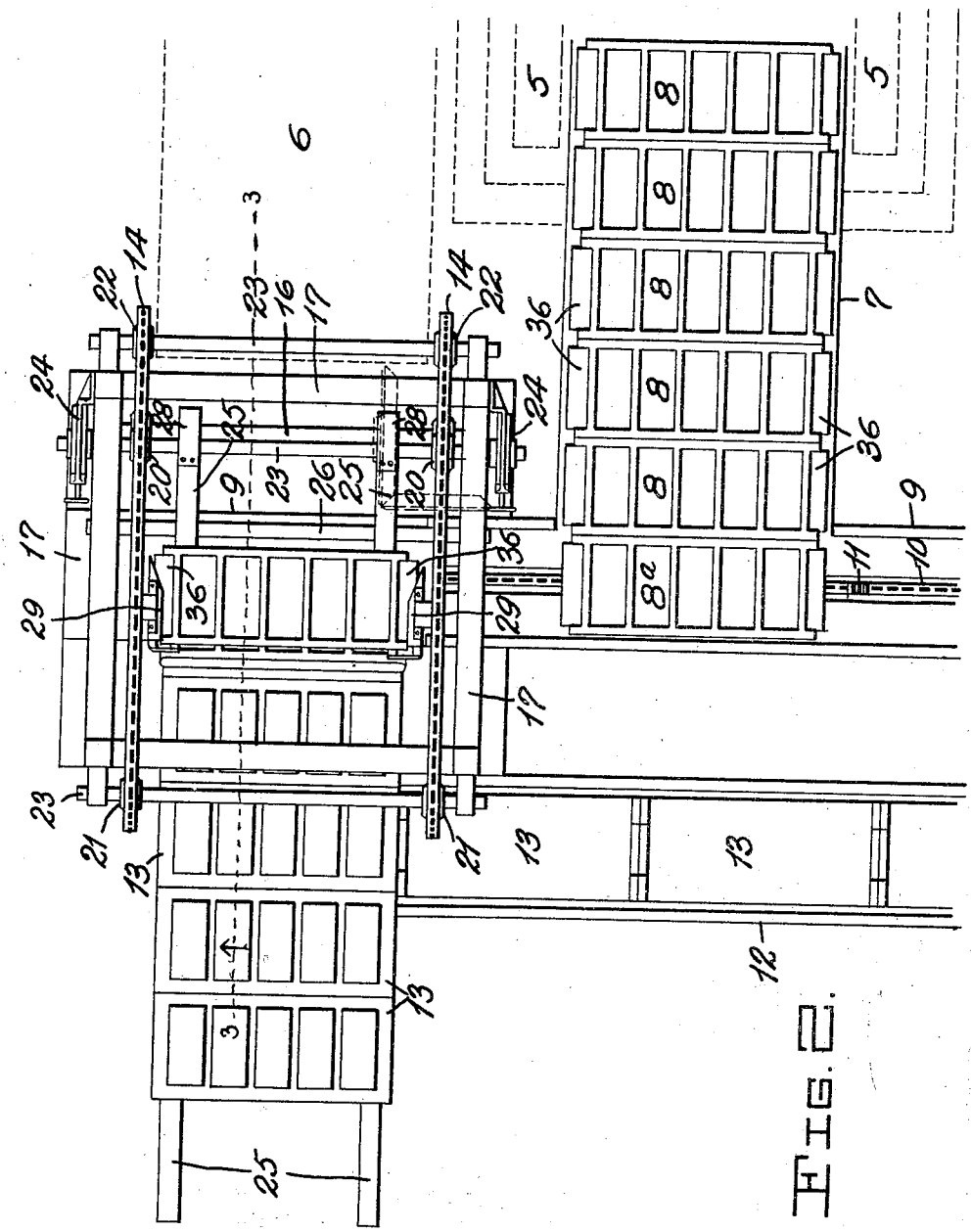

In the drawings which illustrate my invention:—Figure 1 is a side elevation of the device. Fig. 2 is a plan view of the same. Fig. 3 is an enlarged sectional detail view of the dumping mechanism on line 3—3 of Fig. 2. Fig. 4 is an enlarged detail view of one of the carriers attached to the conveyer chains.

In the above defined figures, 5 indicates the location of a brick making machine and 6 the location of the sander operating in connection therewith. A table 7 is provided over which the filled molds 8 pass as they are ejected from the brick machine. A conveyer table 9 is located at right angles to the table 7 and on the same horizontal plane therewith so that the filled molds will pass from the table 7 onto the conveyer table 9, as indicated by the position of the mold $8^a$. A conveyer chain 10 is mounted on the table 9 and is provided with stops or catches 11 adapted to engage the end of the mold $8^a$ and carry the same along the table 9 to a position under the main portion of the device. A pallet feed table 12 is provided, parallel with the conveyer table 9, and adjacent the side thereof remote from the brick machine, on which the empty pallets 13 are placed, face down, as they are removed from the brick drying kiln. A pair of endless conveyer chains 14 are provided running at right angles to the conveyer chain 10. The chains 14 pass over a pair of driving sprocktes 15 mounted on a shaft 16, journaled to the frame-work 17 of the main portion of the machine, and over guiding sprockets 18, 19, 20, 21 and 22 arranged in pairs on shafts 23 journaled to the framework 17, parallel with the drive shaft 16.

The chains 14 and sprockets may be arranged in various ways but I prefer the arrangement shown in the drawings in which the chains run from the driving sprockets 15 over the guide sprockets 18 and 19, the latter of which, 19, are adjacent the outer side of the pallet feed table. From the sprockets 19 the chains run horizontally across the ends of the pallet feed table and conveyer or mold feed table 9 to the sprockets 20 which are slidably mounted on brackets 24 in order that the chains may be tensioned as desired. The chains 14 run diagonally upward from the sprockets 20, the direction of motion of the diagonally moving portion being the reverse of the direction of the horizontally moving portion, to the sprockets 21 and then horizontally to the sprockets 22, the direction of travel being again reversed, so that the two horizontal portions move in the same direction. From the sprockets 22 the chains run downwardly to the drive sprockets 15, thus completing the circuit. The two chains 14 run parallel with each other and are such a distance apart that the molds and pallets may be placed lengthwise between them without touching either.

A dumping table is formed of a pair of guide members 25 located between the chains 14 and lying parallel with the table 7. This dumping table extends into the framework 17, the inner end thereof being supported by a strap 26 and the outer end by a pedestal 27. The inner ends of the guides 25 lie between the sprockets 20 and are curved to correspond with the curvature of the circumference of the sprockets. A metal strap 28 is fixed to the upper edge of each guide and follows the curvature of the inner ends thereof, so that the straps are bent around on themselves in a semicircle of the same diameter as the sprockets 20. The straps extend from the bends along under the guides 25, parallel therewith, across the mold feed table 9 and are then sloped upwardly and attached at their extremities to the under sides of the guides. A plurality of carriers 29 are attached to the chains at regular intervals, the carriers on one chain being opposite those on the other chain whereby the molds may be held between the chains by the carriers. Each carrier comprises a flat strip of metal 30 bent into the form of the letter U, an attaching member 31 fixed thereto and a pallet catch 32. The arms of the U-shaped member 30 are of unequal length and are both pointed, the points being at the outer sides 33, so that the inner sides 34 are tapered off at 35. The attaching member 31 is fixed to the longer arm of the member 30 at the outer side 33 in order that when the carrier is attached to the chain 14 the larger portion of the carrier will overhang the chain. The pallet catch 32 is fixed to the shorter arm of the U-shaped member at the outer edge 33 and extends away from the point of the arm and then transversely so that the upwardly turned extremity thereof will lie inside the inner side of the member 30. The carriers are made right and left hand so that when placed on the chains 14 they will overhang the chains toward each other in order that the molds and pallets may be engaged and carried thereby without contact with either chain. The ends of each mold box are provided with projecting lugs 36 adapted to be engaged between the arms of the U-shaped members to enable the mold boxes to be carried between the chains 14, independent of any other support.

When the mold boxes 8 are ejected from the brick machine they pass over the table 7 and onto the mold feed table 9, where they are caught one at a time and carried into the framework 17 by the catches 11 of the chain 10. The chain 10 disengages from the mold box when the same has been carried to a position between the chains 14. Simultaneously with the travel of the mold box on the mold feed table the catches 32 carried by the chains 14 engage a pallet on the pallet feed table and carry it along the arm 12ª of the table to a position over the mold box, the pallet sliding under the straps 28 which press it tightly down on the mold box. It will be seen in the drawings, Figs. 1 and 3, that the arm 12ª of the pallet feed table is on a level with the top of the mold feed table so that the pallet will slide easily onto the mold box lying in position on the mold feed table. When the pallet is in position over the mold box the arms of the carriers 28 engage the lugs 36 on the ends of the mold box and carry it along under the pallet, the pallet being held in place over the mold box by the catches 32 and the straps 28. The mold box and pallet are carried by the chains 14 over the sprockets 20 so that they are inverted, the pallet lying face up on the guides 25 forming the dumping table while the mold box lies upside down on the pallet. During the passage around the sprockets 20 the semicircular bends in the straps 28 hold the pallet firmly against the mold box so that the clay therein will not fall out during the inversion. The chains 14, which travel diagonally upward from the sprockets 20 to the sprockets 21, carry the inverted mold box with them so that the same is gradually lifted from the pallet and the clay contents allowed to remain on the pallet in the exact form of the mold. During the lift of the mold box the catches 32 remain in engagement with the pallet and slide it along the guides 25, keeping it directly under the mold box until the latter is lifted above and entirely free from the discharged material, thus preventing the lower edge of the mold box from shearing or scraping off a portion of the discharged material. Immediately after the mold box is lifted above the discharged clay the upward movement of the chains disengages the catches 32 from the pallet so that the same is left stationary on the guides 25 and ready to be removed and conveyed to the dry kiln with the molded clay thereon. The empty mold box is carried by the chains 14 over the sprockets 21 and along and over the sprockets 22. After passing over the sprockets 22 the chains take a downward direction and the lugs 36 on the mold box slip out from between the arms of the carriers 28 so that the mold box is disengaged from the chains and falls by gravity into the sander.

The chains of the device may be driven directly from the brick machine or from some other source and geared to operate at such a speed that the mold boxes are dumped and dropped into the sander as fast as they are filled by the brick making machine. The chain 10 may be driven directly from the brick machine or may be geared to the drive shaft 16 of the dumper, as shown in dotted lines.

It will be obvious from the foregoing description and drawings that the device disclosed will attain the objects set forth and that the plastic clay will be removed from the mold boxes without being in any way mutilated and will be delivered from the apparatus in such a form that it may be conveyed directly to the dry kiln without further manipulation. It will also be seen that the empty mold boxes are automatically returned to the sander, thus completing the cycle of operation of the machine.

Having thus described my invention, what I claim and desire to secure by Letters Patent, is:—

1. In a device of the class described, the combination with a brick making machine and mold boxes having end lugs, of a conveyer adapted to receive filled molds from the brick machine, means for placing a pallet over each of said molds and forked members for engaging the lugs of said mold boxes whereby the mold boxes and pallets may be alined and carried to an inverted position.

2. In a device of the class described, the combination with a brick machine and mold boxes having end lugs, of a conveyer adapted to receive filled mold boxes from the brick machine, means for locating a pallet over each mold box, forked members on the conveyer for engaging the lugs of said mold boxes whereby the mold boxes and pallets may be carried to an inverted position and means for maintaining the pallets in close engagement with the mold boxes during inversion.

3. In a device of the class described, the combination with a brick making machine, sander therefor and mold boxes having end lugs, of a mold feed table, a pallet feed table, a dumping table above and at right angles to said mold and pallet feed tables, a conveyer extending across said mold and pallet feed tables and parallel with said dumping table, a second conveyer mounted on the mold feed table adapted to receive filled molds from the brick machine and convey the same singly to a position on the mold feed table under the first conveyer, means mounted on the first conveyer for transferring pallets from the pallet feed table to a position over said molds, means mounted on the first conveyer adapted to engage the lugs of the mold boxes whereby the mold boxes and pallets may be carried to an inverted position on the dumping table and means for maintaining the pallets in close engagement with the mold boxes during inversion.

4. In a device of the class described, the combination with a brick machine, sander therefor, mold boxes having end lugs, and pallets, of a mold feed table, a pallet feed table, a dumping table above and at right angles to said mold and pallet feed tables, a conveyer extending across said mold and pallet feed tables and parallel with said dumping table, a second conveyer mounted on the mold feed table adapted to receive filled molds singly from the brick machine, and convey the same to a position on the mold feed table under the first conveyer, means mounted on the first conveyer for transferring pallets singly from the pallet feed table to a position over said molds, means mounted on the first conveyer adapted to engage the lugs of the mold boxes whereby the mold boxes and pallets may be carried to an inverted position on the dumping table, the mold boxes lifted from the pallets and delivered into the sander, and means for maintaining the pallets in close engagement with the mold boxes during transfer from the mold feed table to the dumping table.

5. In a brick mold dumping apparatus, the combination with a brick making machine, a sander therefor, mold boxes having end lugs, and pallets, of a mold feed table lying at right angles to the line of delivery of the brick machine, a pallet feed table parallel with said mold feed table, a dumping table above and at right angles to said mold and pallet feed tables, a conveyer running horizontally across the pallet and mold feed tables, diagonally above the dumping table in a reverse direction parallel therewith and horizontally and downwardly to the sander, a second conveyer mounted on the mold feed table adapted to receive filled molds singly from the brick machine and convey the same to a position on the mold feed table under the first conveyer, a plurality of pallet catches mounted on the first conveyer adapted to transfer pallets singly from the pallet feed table to a position over the molds on the mold feed table, a plurality of carriers mounted on said first conveyer adjacent the pallet catches adapted to engage the lugs of the mold boxes whereby the conveyer may transfer the pallets and mold boxes to an inverted position on the dumping table, raise the mold boxes from the pallets to discharge the contents thereof and discharge the empty mold boxes into the sander, and straps fixed to the dumping table adapted to maintain the pallets in close engagement with the mold boxes during transfer from the mold feed table to the dumping table.

6. In a brick mold dumping apparatus, the combination with a brick making machine, sander therefor, mold boxes having end lugs, and pallets, of a mold feed table at right angles to the line of delivery of the brick machine, a pallet feed table parallel with said mold feed table, a dumping table above and at right angles to said mold and pallet feed tables, a conveyer parallel with said dumping table, a pair of drive sprockets for said conveyer, a plurality of guide sprockets for said conveyer arranged so that the conveyer travels horizontally across the pallet and mold feed tables, diagonally upward in a reverse direction above the dumping table, horizontally over the top of the machine in the original direction and downward over the sander to the drive sprockets, means for regulating the tension of said conveyer, guides fixed to the under side of the dumping table, a conveyer on the mold feed table adapted to transfer molds from the brick machine to the first conveyer, a plurality of pallet catches and a plurality of mold carriers mounted on the first conveyer, substantially as described.

In witness whereof I have hereunto set my hand in the presence of two witnesses.

WILLIAM E. LOOMIS.

Witnesses:
ALEXINA JONCAS,
G. W. BORLAD.